No. 696,643. Patented Apr. 1, 1902.
C. L. V. KINNEY.
END GATE FOR MANURE SPREADER OR SIMILAR BEDS.
(Application filed Dec. 7, 1901.)
(No Model.)
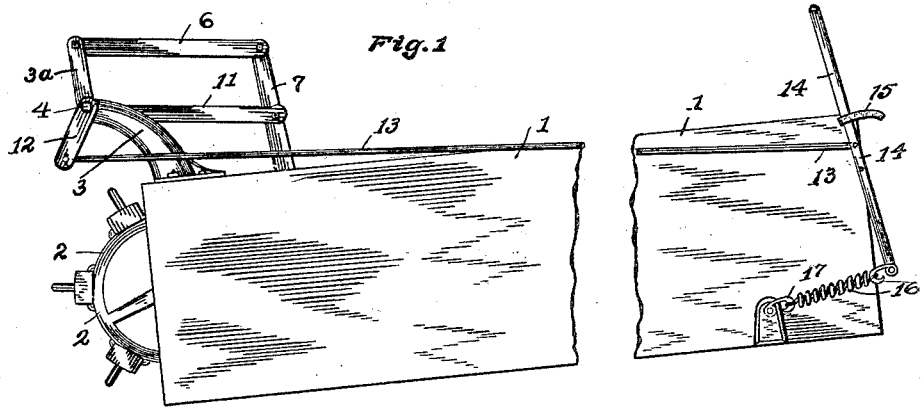
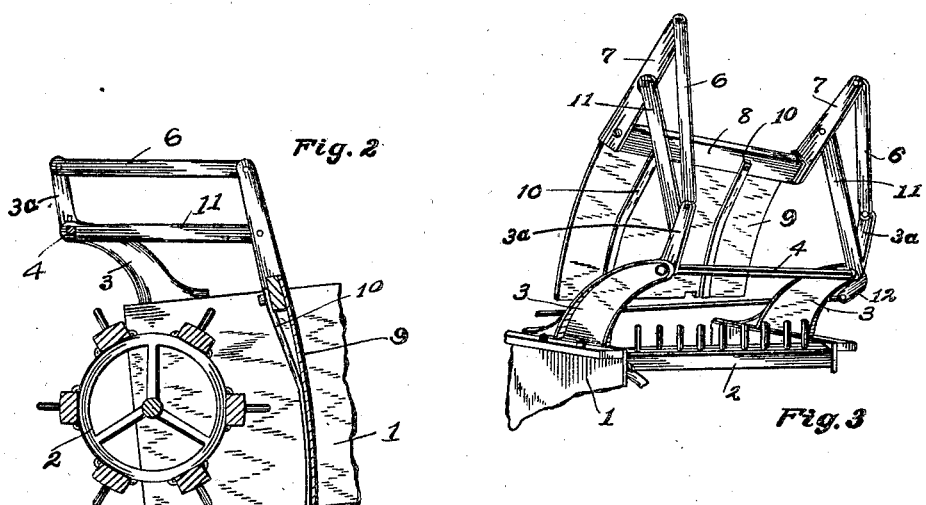
WITNESSES:
F. G. Werner
A. L. Phelps
INVENTOR
Clement L. V. Kinney
BY
C. A. Shepherd
ATTORNEY
THE NORRIS PETERS CO., PHOTO-LITHO., WASHINGTON, D. C.

UNITED STATES PATENT OFFICE.

CLEMENT L. V. KINNEY, OF NEWARK, OHIO, ASSIGNOR TO THE NEWARK MACHINE COMPANY, OF NEWARK, OHIO, A CORPORATION OF OHIO.

END-GATE FOR MANURE-SPREADER OR SIMILAR BEDS.

SPECIFICATION forming part of Letters Patent No. 696,643, dated April 1, 1902.

Application filed December 7, 1901. Serial No. 84,990. (No model.)

*To all whom it may concern:*

Be it known that I, CLEMENT L. V. KINNEY, a citizen of the United States, residing at Newark, in the county of Licking and State of Ohio, have invented a certain new and useful Improvement in End-Gates for Manure-Spreader or Similar Beds, of which the following is a specification.

My invention relates to the improvement of manure-spreaders, and has particular relation to the improvement of end-gates for that class of spreaders in which a toothed discharging reel or cylinder is rotatably mounted in the rear open end thereof.

The objects of my invention are to provide a spreader bed or body with an improved construction of end-gate of such arrangement of parts as to admit of the same being readily and easily operated, to so construct said end-gate as to insure its withdrawal from the spreader wagon-bed without compression of the load, and to produce other improvements the details of construction of which will be more fully pointed out hereinafter. These objects I accomplish in the manner illustrated in the accompanying drawings, in which—

Figure 1 is a side elevation of a manure-spreader bed having my improvement thereon, said bed-body being shown broken for the sake of convenience in illustration. Fig. 2 is a central vertical section through the rear portion of the bed and through my improved end-gate, the latter being shown in its lowered position. Fig. 3 is a view in perspective of said end-gate, showing the same in its elevated position; and Fig. 4 is a detail sectional view showing the connection of one of the end-gate arms and the shaft.

Similar numerals refer to similar parts throughout the several views.

1 represents the inclined wagon-like body or bed of a manure-spreader, within the rear end portion of which is journaled and suitably operated a discharging-reel or toothed "cylinder" 2. Rising from the tops and opposite sides of the bed 1, adjacent to the rear end thereof, are the rearwardly-curved lower portions of brackets 3, the latter having upwardly-extending terminal arms 3ª. Extending between the outer ends of the lower arms of the brackets 3 is a horizontal squared shaft 4, which is rotatably mounted in said brackets in the manner hereinafter described. To each of the bracket-arms 3ª is pivotally connected the outer end of a forwardly-extending bar 6, the forward ends of said bars 6 being pivotally connected with the upper or outer ends of upwardly-extending side frame-arms 7 of an end-gate, said end-gate comprising a horizontal top bar 8, from which the bars 7 rise, and a forwardly bowed or curved downwardly-extending metallic plate or end-gate body 9, the upper portion of which is supported by said bar 8 and the rear side of which is connected with said bar by suitably-fixed braces 10. The bars 7 are further connected with the shaft 4 by bars 11, the forward ends of which are pivotally connected with the central portions of said bars 7 and the rear ends of which, as shown more clearly in Fig. 4 of the drawings, are formed with laterally-extending hubs 11ª, which are formed with central squared openings to receive the shaft 4. These hubs are rounded and are journaled in openings formed in the brackets 3. I also connect with one end of said shaft 4 and with the lower adjoining end of one of the bars 11 a short downwardly-extending arm 12. The lower end of this arm 12 is pivotally connected with the rear end of an operating-rod 13, the latter extending forwardly along the upper portion and inner side of the bed 1 and having its forward end, as indicated in Fig. 1, pivotally connected with a lever 14, the latter being fulcrumed to the forward end portion of said bed. The upper portion of the lever is adapted to move within a suitable guide-bracket or keeper 15, which is supported from said bed, and the lower end of the lever is through the medium of a spring 16 connected with a lug-hook 17 on the lower portion of the bed side, at a suitable point in rear of the forward end of said bed.

It will be observed that when the upper portion of the lever 14 is thrown to its rearmost position, as indicated in Fig. 1, the arm 12 will have had imparted thereto such rearward incline as to cause the end-gate frame-arms 6 and 11 to have assumed the substantially horizontal and parallel positions indicated in Figs. 1 and 2, in which positions it will be seen that the end-gate body or plate will be supported on the bottom of the bed 1 and between the sides thereof, as shown in Fig. 2. In this manner it will be observed that the end-gate body is supported in front of the cylinder 2 in such position as to prevent the contents of the load coming into contact with or bearing directly against said cylinder 2. It being desired, however, to raise the end-gate to permit the discharge of the load or any portion thereof, it is obvious that the lever-bar 14 may be pulled forward, the force thus exerted thereon, in conjunction with the rearward pull on the lower end of the lever by the spring 16, being such as to cause the lower end of the arm 12 to swing forward and the frame-arms 6 and 11, together with the body of the end-gate, to swing upward and rearward. In this upward and rearward movement it will be seen that the forward ends of the bars 6 will move upward and rearward in the arcs of circles of which the rear pivot-points of said bars are the centers and that in this rearward movement of the end-gate-supporting frame said end-gate body will not only be elevated, but will at the same time be drawn rearward and away from the pressure of the load which is in front thereof, thus insuring ease in the elevation of the end-gate. It will be observed, however, that ease in operation is further contributed by the spring 16, the normal tendency of which is to draw the lower end of the lever 14 toward the rear end of the bed, thus obviating the necessity of employing but comparatively slight power in moving the upper end of the lever forward and in lifting the end-gate.
From the construction and operation described it will be seen that a simple and reliable construction of end-gate is provided which may be produced at a reasonable cost of manufacture and which may be readily and easily operated.

Having now fully described my invention, what I claim, and desire to secure by Letters Patent, is—

1. In an end-gate for manure-spreader or similar beds, the combination with the bed-body 1, of bracket-arms rising from the rear end thereof and a semirotatable shaft extending between said bracket-arms, of an end-gate body and its supporting-frame, said body adapted to fit between the sides of said bed, bars 6 jointedly connecting said brackets and said end-gate frame and means connected with said shaft for imparting a semirotary motion thereto, substantially as specified.

2. In an end-gate for manure-spreader or similar beds, the combination with the bed-body 1, of angular bracket-arms rising from said bed sides and a semirotatable shaft extending between said brackets, of an end-gate body adapted to fit between the sides of said bed, bars 6 jointedly connecting said brackets and end-gate frame and bars 11 having their forward ends pivotally connected with said end-gate frame and their rear ends rigidly connected with said shaft and means for imparting a semirotary motion to the shaft, substantially as specified.

3. In an end-gate for manure-spreader or similar beds, the combination with a bed, brackets 3 rising from the rear end thereof, an end-gate body adapted to enter said bed as described, and swinging frame-bars connecting said end-gate frame within said shaft and brackets, of a fulcrumed lever at the forward end portion of the bed, a spring connecting the lower end of said lever with a fixed point in front of the latter and a rod 13 having its ends pivotally connected with an operating-arm of said shaft and with said lever, substantially as specified.

CLEMENT L. V. KINNEY.

In presence of—
JNO. T. MCCUNE,
E. C. SHARPE.